United States Patent [19]
Wakana et al.

[11] Patent Number: 5,989,680
[45] Date of Patent: Nov. 23, 1999

[54] MAGNETIC RECORDING MEDIUM

[75] Inventors: Shigeaki Wakana; Shingo Komaba, both of Tochigi-ken, Japan

[73] Assignee: Kao Corporation, Tokyo, Japan

[21] Appl. No.: 09/023,127

[22] Filed: Feb. 13, 1998

[51] Int. Cl.$^6$ ...................................................... G11B 5/68
[52] U.S. Cl. ........................ 428/141; 428/216; 428/328; 428/329; 428/336; 428/694 BB; 428/694 BR; 428/694 BS; 428/900
[58] Field of Search .................................... 428/141, 216, 428/328, 329, 336, 694 BB, 694 BR, 694 BS, 900

[56] References Cited

U.S. PATENT DOCUMENTS 5,547,772  8/1996  Saito et al. .......................... 428/694 B

FOREIGN PATENT DOCUMENTS 4-1914  1/1992  Japan .

*Primary Examiner*—Stevan A. Resan
*Attorney, Agent, or Firm*—Oblon, Spivak, McClelland, Maier & Neustadt, P.C.

[57] ABSTRACT

A magnetic recording medium having a nonmagnetic polymer substrate, a magnetic layer and a backcoating layer, wherein surface profile of the magnetic and the backcoating layers satisfies the following condition (i), and the nonmagnetic polymer substrate satisfies the following conditions (ii) and (iii): (i) the skewness of the surface roughness profiled of the backcoating layer is greater than that of the magnetic layer; (ii) the nonmagnetic polymer substrate has a molecular orientation ratio of 1.11 or greater; and (iii) the angle between the main axial direction of the polymer chains in the nonmagnetic polymer substrate and the longitudinal direction of the nonmagnetic polymer substrate is 7° or smaller, has excellent electromagnetic conversion characteristics and running stability.

20 Claims, 1 Drawing Sheet

MAGNETIC RECORDING MEDIUM

BACKGROUND OF THE INVENTION

1. Field of the Invention

The present invention relates to a magnetic recording medium, such as a magnetic tape, which can accept high density recording, has a high reproduction output and excellent running stability.

2. Description of the Related Art

A variety of magnetic recording media, such as magnetic tapes (e.g., a video tape) and magnetic disks for computer memories, have been in use. The demand for high performance of these magnetic recording media, particularly the demand for high recording density and running durability has been increasing from year to year.

An increase in recording density is achieved by a reduction in recording wavelength, which can result in insufficient reproduction output. In order to maintain a sufficient output level, it has been proposed to adopt a multilayer structure in which an intermediate layer for improving electromagnetic conversion characteristics is provided under a magnetic layer.

It is essential that the track of a magnetic recording medium in contact with a magnetic head should be stable during running in order to obtain stable output during running. For this purpose it is desirable for the tape to run stably.

In order to obtain a high output in a stable manner in a high-density magnetic recording medium, it has been a practice to provide a recording layer having a multilayer structure and to make the surface of the magnetic layer smooth, i.e., to reduce the surface roughness. However, today's increased recording density has made it more difficult to obtain a sufficiently high output by applying conventional techniques. Further, a mere improvement in surface smoothness causes an increase in the coefficient of friction between a magnetic head and the recording medium, and sticking can occur between them, which impairs running stability.

Related art concerning the surface roughness of a magnetic layer or a backcoating layer in a magnetic recording medium is found in Japanese Patent Laid-Open No. 1914/92 and U.S. Pat. No. 5,547,772. The former discloses a magnetic recording medium having a magnetic layer whose surface roughness is 6 nm or less and a backcoating layer whose surface roughness is 8 nm or less, the backcoating layer having 500 to 5000 projections having a height of 0.05 to 0.8 $\mu$m per mm$^2$. The magnetic recording medium disclosed is not deemed suitable for high-density recording because the magnetic layer is as thick as 3 $\mu$m and the total medium is as thick as 13.5 $\mu$m. In addition, there is no mention of the molecular orientation ratio of the substrate and the skewness of the magnetic layer and the backcoating layer, as well as no mention of the influences of the molecular orientation ratio and skewness upon the wobbling of a magnetic recording medium in the width direction during running.

U.S. Pat. No. 5,547,772 discloses a magnetic recording medium in which the magnetic layer has a thickness of 1.2 $\mu$m or smaller and a surface roughness of 0.006 $\mu$m or less. U.S. patent also does not refer to the molecular orientation ratio of the substrate and the skewness of the magnetic layer and backcoating layer, and also does not refer to the influences of these factors on the wobbling of a magnetic recording medium in the width direction during running.

SUMMARY OF THE INVENTION

An object of the present invention is to provide a magnetic recording medium having excellent electromagnetic conversion characteristics and running stability.

The inventors of the present invention have conducted extensive investigations in an attempt to accomplish this object. As a result, it has now been found that the symmetry of the surface profile of a backcoating layer and of a magnetic layer, and the molecular orientation of a nonmagnetic polymer substrate, have a strong influences on the running properties of the magnetic recording medium and thereby on the reproduction output.

The present invention includes A magnetic recording medium comprising:

(I) a nonmagnetic polymer substrate, (II) a magnetic layer, on the nonmagnetic polymer substrate, and (III) a backcoating layer located on the nonmagnetic polymer substrate, opposite the magnetic layer, wherein (i) the skewness of the backcoating layer is greater than the skewness of the magnetic layer, (ii) the nonmagnetic polymer substrate has a molecular orientation ratio of 1.11 or greater, and (iii) the angle between the main axial direction of the polymer chains in the nonmagnetic polymer substrate and the longitudinal direction of the nonmagnetic polymer substrate is 7° or smaller.

The magnetic recording medium according to the present invention enables high-density recording while securing a stable high reproduction output. When applied to a magnetic tape, in particular, the present invention markedly reduces the wobbling in the width direction of the tape during running to provide excellent running stability, which promises capability of high-density recording and high and stable output on reproduction.

BRIEF DESCRIPTION OF THE DRAWING

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE INVENTION

Figure 1:
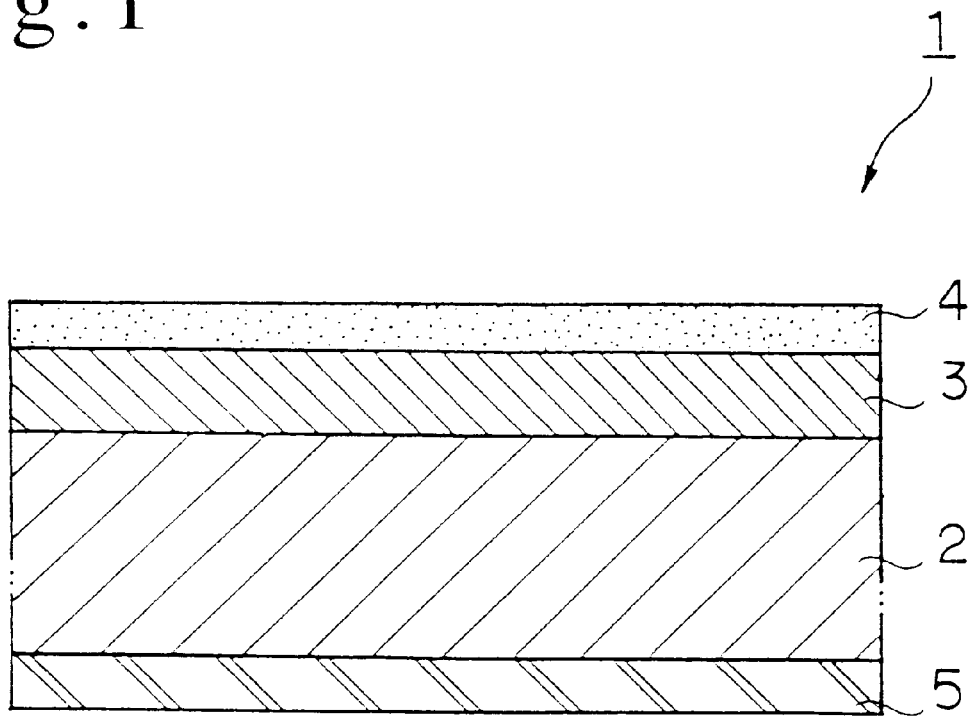
FIG. 1 is a schematic cross section showing a preferred structure of the magnetic recording medium according to the present invention.

In FIG. 1 is shown schematically a preferred structure of the magnetic recording medium according to the present invention. The magnetic recording medium 1 shown in FIG. 1 is a multilayer coated type, comprising a nonmagnetic polymer substrate 2, an intermediate layer 3 provided on one side of the nonmagnetic polymer substrate 2, a magnetic layer 4 provided on the intermediate layer as a top layer, and a backcoating layer 5 provided on the other side of the nonmagnetic polymer substrate 2. The magnetic layer 4 contains a ferromagnetic powder and a binder.

The nonmagnetic polymer substrate 2 which may be used in the present invention is not particularly limited as far as the above-mentioned conditions (ii) and (iii) are satisfied and includes flexible films and disks made of a polymer. The polymer used for forming flexible films or disks includes polyesters such as polyethylene terephthalate, polybutylene terephthalate, polyethylene naphthalate, polycyclohexylene dimethyleneterephthalate and polyethylene bisphenoxycarboxylate; polyolefins such as polyethylene and polypropylene; cellulose derivatives such as cellulose acetate and cellulose acetate propionate; vinyl resins such as polyvinyl chloride and polyvinylidene chloride; polyamide; polyimide; polycarbonate; polysulfone; polyether ether ketone; and polyurethane. Films made up of two or more kinds of these polymers may also be used. The thickness of the substrate 2 is not particularly limited, usually ranging from 2 to 100 μm, preferably 2 to 76 μm.

The magnetic layer 4 is usually provided as a top layer of the magnetic recording medium 1, i.e., the magnetic layer is present on the surface of the magnetic recording medium 1. The magnetic layer may be formed by coating the intermediate layer 3 with a magnetic coating composition comprising a ferromagnetic powder, a binder and a solvent. The ferromagnetic powder may be a ferromagnetic iron oxide powder such as $\gamma$-$Fe_2O_3$ and Co-coated $\gamma$-$Fe_2O_3$; a ferromagnetic metal powder consisting of or predominantly comprising iron; and/or a ferromagnetic hexagonal ferrite powder. The ferromagnetic metal powder may be those having a metal content of 70% or more by weight, 60% or more by weight of which may be Fe. Specific examples of the ferromagnetic metal powder include Fe powder and powder of an Fe alloy, e.g., Fe—Co, Fe—Ni, Fe—Al, Fe—Ni—Al, Fe—Co—Ni, Fe—Ni—Al—Zn and Fe—Al—Si.

The ferromagnetic iron oxide powder and ferromagnetic metal powder predominantly comprising iron preferably have an acicular shape or a spindle shape, with its major axis preferably having a length of 0.05 to 0.25 μm, still preferably 0.05 to 0.2 μm, its acicular ratio being preferably 3 to 20, its X-ray particle diameter being preferably 130 to 250 Å, and its BET specific surface area preferably ranging from 30 to 70 $m^2/g$. The ferromagnetic hexagonal ferrite powder includes fine tabular particles of barium ferrite, strontium ferrite, and these particles with the Fe atoms thereof partially replaced with atoms of Ti, Co, Ni, Zn, V or the like. The ferromagnetic hexagonal ferrite powder preferably has a tabular diameter of 0.02 to 0.09 μm, a tabular ratio of 2 to 7, and a BET specific surface area of 30 to 60 $m^2/g$.

The coercive force of the ferromagnetic powder is preferably 1500 to 2500 Oe, still more preferably 1600 to 2400 Oe. Within this range, sufficient RF output over the entire wavelength region can be obtained, and satisfactory overwrite characteristics are exhibited. The saturation magnetization of the ferromagnetic iron oxide powder and ferromagnetic metal powder preferably ranges from 100 to 180 emu/g, still more preferably 110 to 160 emu/g. The saturation magnetization of the ferromagnetic hexagonal ferrite powder preferably ranges from 30 to 70 emu/g, still more preferably 45 to 70 emu/g. Within these ranges of saturation magnetization, sufficient reproduction outputs can be obtained.

If desired, the ferromagnetic powder to be used in the magnetic coating composition forming the magnetic layer 4 may contain rare earth elements or transition metal elements.

In order to improve the dispersibility of the ferromagnetic powder, the powder may be subjected to a surface treatment. The surface treatment may be carried out in the same manner as described in *Characterization of Powder Surfaces,* Academic Press, incorporated herein by reference. For example, the surface of the ferromagnetic powder can be coated with an inorganic oxide, such as $Al_2O_3$, $SiO_2$, $TiO_2$, $ZrO_2$, $SnO_2$, $Sb_2O_3$ or ZnO. These inorganic oxides may be used either individually or as a combination of two or more thereof The surface treatment may also be carried out by using an organic substance such as a silane coupling agent, a titanium coupling agent or an aluminum coupling agent.

The binder which can be used in the magnetic coating composition forming the magnetic layer 4 includes thermoplastic resins, thermosetting resins and reactive resins, either individually or as a mixture thereof. Examples of suitable binders are vinyl chloride resins, polyester, polyurethane, nitrocellulose and epoxy resins. In addition, the resins described in Japanese Patent Laid-Open No. 57-162128, page 2, upper right column, line 19 to lower right column, line 19, incorporated herein by reference, can also be used. These binders may contain a polar group for improvement in dispersibility. The binder may be preferably used in an amount of from 5 to 200 parts by weight, preferably of from 5 to 70 parts by weight, per 100 parts by weight of the ferromagnetic powder.

The solvent which can be used in the magnetic coating composition for providing the magnetic layer 4 includes ketones, esters, ethers, aromatic hydrocarbons and chlorinated hydrocarbons. Specific examples of the solvents are given in Japanese Patent Laid-Open No. 57-162128, page, 3, upper right column, line 17 to page 4, lower left column, line 10, incorporated herein by reference. The solvent may be preferably used in an amount of 80 to 500 parts by weight, still more preferably 100 to 350 parts by weight, per 100 parts by weight of the ferromagnetic powder.

If desired, the magnetic coating composition used for the formation of the magnetic layer 4 may contain additives generally used in magnetic recording media. Examples of the additives include lubricants such as fatty acids and fatty acid esters, abrasive particles comprising a material having a Mohs hardness of 6 or higher, antistatics such as carbon black, hardeners such as isocyanate compounds, rust inhibitors, dispersants, antifungals and fungistats. Specific examples of the additives are described in Japanese Patent Laid-Open No. 57-162128, page 2, lower left column, line 6 to lower right column, line 10 and page 3, lower left column, line 6 to lower right column, line 18, incorporated herein by reference.

The magnetic layer 4 as a top layer preferably has a thickness of 0.01 to 0.5 μm, still more preferably 0.02 to 0.3 μm, still more preferably 0.05 to 0.3 μm. Within this range, durability and electromagnetic conversion characteristics are well balanced. The magnetic layer 4 formed of the above-described magnetic coating composition preferably has a coercive force of 1500 to 3500 Oe, still more preferably 1500 to 3200 Oe, particularly preferably 1600 to 2800 Oe. The magnetic layer 4 preferably has a saturation flux density of 0.1 to 0.5 T. particularly 0.15 to 0.45 T.

The intermediate layer 3 may be either magnetic or nonmagnetic. Where the intermediate layer 3 is magnetic, the intermediate layer 3 contains a magnetic powder (hereinafter referred to as a magnetic intermediate layer). The magnetic intermediate layer is formed by applying a magnetic coating composition comprising a magnetic powder, a binder and a solvent onto the substrate 2. Where the intermediate layer 3 is nonmagnetic, the intermediate layer 3 contains a nonmagnetic powder (hereinafter referred to as a nonmagnetic intermediate layer), which is formed by applying a nonmagnetic coating composition comprising a nonmagnetic powder, a binder and a solvent on the substrate 2.

The magnetic powder to be used in the magnetic coating composition for the magnetic intermediate layer 3 preferably includes ferromagnetic powder, either a soft magnetic powder or a hard magnetic powder as ferromagnetic powder. While the soft magnetic powder to be used is not particularly limited in kind, soft magnetic materials used in light electric appliances, such as in a magnetic head or in an electronic circuit are preferred. For example, the soft magnetic materials described in Tikazumi Toshinobu, *Kyojiseitai no Buturi* (2nd Vol.), "*Jikitokusei to Ohyo*", pp. 368–376, Shokabo (1984), which is incorporated herein by reference, may be used. Soft magnetic oxide powders and soft magnetic metal powders may be mentioned as specific examples.

The hard magnetic powder may be ferromagnetic iron oxide powder, ferromagnetic metal powder predominantly comprising iron, and/or ferromagnetic hexagonal ferrite powder. Examples of the ferromagnetic iron oxide powder, ferromagnetic metal powder and ferromagnetic hexagonal ferrite powder described for use in the magnetic coating composition used for the formation of the magnetic layer 4, may be used in the magnetic intermediate layer 3. The physical properties such as coercive force, saturation magnetization, shape, specific surface area, etc., of the ferromagnetic iron oxide powder, ferromagnetic metal powder and ferromagnetic hexagonal ferrite powder described for the magnetic layer 4 also apply to the hard magnetic powder used in the magnetic intermediate layer 3.

If desired, the magnetic powder in the magnetic coating composition forming the magnetic intermediate layer 3 (hereinafter also called intermediate magnetic coating composition) may contain rare earth elements or transition metal elements. The same surface treatments as could be given to the ferromagnetic powder of the magnetic layer 4 may also be applied to the magnetic powder of the intermediate magnetic layer 3.

The binder and solvent which can be used in the intermediate magnetic coating composition can be selected from those usable in the magnetic coating composition for the magnetic layer 4. The binder is preferably used in an amount of 5 to 200 parts by weight, still more preferably 5 to 70 parts by weight, per 100 parts by weight of the total amount of the magnetic powder and nonmagnetic powder that are used, if desired, as hereinafter described. The solvent is preferably used in an amount of 80 to 500 parts by weight, still more preferably 100 to 350 parts by weight, per 100 parts by weight of the magnetic powder and nonmagnetic powder (if desired).

If desired, the intermediate magnetic coating composition may contain various additives usable in the magnetic coating composition for the magnetic layer 4. Such additives include lubricants such as fatty acids and fatty acid esters, abrasives such as alumina particles, antistatics such as carbon black, and hardeners such as isocyanate compounds. The intermediate magnetic coating composition may further contain a nonmagnetic powder that is used in a nonmagnetic coating composition for the formation of a nonmagnetic intermediate layer hereinafter described. In this case, the nonmagnetic powder is preferably used in an amount of 30 to 70 parts by weight, particularly 40 to 60 parts by weight, per 100 parts by weight of the magnetic powder.

The nonmagnetic powder which may be used in the nonmagnetic coating composition for the formation of the nonmagnetic intermediate layer 3 includes particles of carbon black, graphite, titanium oxide, barium sulfate, zinc sulfide, magnesium carbonate, calcium carbonate, zinc oxide, boron nitride, tin dioxide, silicon dioxide, nonmagnetic chromium oxide, alumina, nonmagnetic iron oxide, titanium carbide and/or resins. In particular, nonmagnetic iron oxide, titanium oxide, carbon black, alumina, silicon oxide, silicon nitride and/or boron nitride are preferred. These nonmagnetic powders may be used either individually or as a combination of two or more thereof. The nonmagnetic particles may have a spherical shape, a tabular shape, or an acicular shape, or may be amorphous. Spherical, tabular, and amorphous nonmagnetic particles preferably have a particle size of 5 to 200 nm, and acicular particles preferably have a major axis length of 20 to 300 nm with an acicular ratio of 3 to 20. For the purpose of improving dispersibility of the nonmagnetic powder, the nonmagnetic powder may be subjected to the same surface treatment as could be given to the ferromagnetic powder for use in the magnetic layer 4.

If desired, the nonmagnetic coating composition used for the formation of the nonmagnetic intermediate layer (hereinafter also called an intermediate nonmagnetic coating composition) may contain various additives that could be incorporated into the magnetic coating composition for the magnetic layer 4. The binder and solvent to be used in the intermediate nonmagnetic coating composition are selected from those usable in the magnetic coating composition for the formation of the magnetic layer 4. The binder is preferably used in an amount of 5 to 200 parts by weight, still more preferably 5 to 70 parts by weight, per 100 parts by weight of the nonmagnetic powder.

The solvent is preferably used in an amount of 80 to 500 parts by weight, particularly 100 to 350 parts by weight, per 100 parts by weight of the nonmagnetic powder.

The intermediate layer 3, either magnetic or nonmagnetic, preferably has a thickness of 0.05 to 3.0 μm, still more preferably 0.2 to 3.0 μm, even more preferably 0.5 to 3.0 μm. The magnetic recording medium may have sufficient bending stiffness with the intermediate layer 3 having a thickness within this range.

Where the intermediate layer is magnetic, i.e., the intermediate layer is the magnetic intermediate layer, it is preferable for the magnetic intermediate layer 3 to have a coercive force of 1000 to 4400 Oe, particularly 1900 to 3800 Oe, from the standpoint of overwrite characteristics and output balance in a low to high frequency region. It is also preferable for the magnetic intermediate layer 3 to have a saturation flux density of 0.02 to 0.1 T, particularly 0.03 to 0.09 T. If the saturation flux density is too high, overwrite characteristics may be reduced, resulting in an unfavorable increase in noise. If it is too low, the output may be insufficient.

The backcoating layer 5 can generally be formed by coating the back side of the nonmagnetic polymer substrate 2 with a backcoating composition. The backcoating composition usually comprises a nonmagnetic powder, a binder and a solvent as main components.

The nonmagnetic powder used in the backcoating composition is not particularly limited as long as it is nonmagnetic. The nonmagnetic powder species enumerated for the intermediate nonmagnetic coating composition used for the formation of the nonmagnetic intermediate layer 3 may be used. In particular, carbon black, titanium oxide, barium sulfate, calcium carbonate, alumina and/or nonmagnetic iron oxide are preferably used. In a preferred embodiment of the present invention, the nonmagnetic powder of the backcoating layer 5 preferably comprises, as nonmagnetic powders, fine carbon black powder having an average particle size of 0.01 to 0.03 μm and a nonmagnetic powder having an average particle size of 0.1 to 0.3 μm and a Mohs hardness of 6 or higher in a mixing ratio of 99:1 to 60:40 by weight. The backcoating layer containing such nonmagnetic powders is preferred for the following reasons: The output of the magnetic recording medium can be further improved; and the backcoating layer is prevented from transferring its surface profile to the surface of the magnetic layer during storage, and as a result, deterioration in recording and reproduction characteristics which may take place during storage can be further suppressed. Such a preferred backcoating layer may be formed by formulating the above-described fine carbon black powder and the nonmagnetic powder at the above-described mixing ratio into the backcoating composition.

The fine carbon black powder used in the above-described preferred embodiment preferably has an average particle size of 0.01 to 0.03 μm as specified above. A still more preferred average particle size is 0.01 to 0.02 μm. The term "average particle size" as used for the fine carbon black powder denotes an average primary particle size of fine carbon black powder, which can be measured by, for example, observation under an electron microscope.

The nonmagnetic powder used in the above-described preferred embodiment preferably has an average particle size of 0.1 to 0.3 μm as specified above. A still more preferred average particle size is 0.2 to 0.3 μm. It is preferable for the nonmagnetic powder to have a Mohs hardness of 6 or higher as specified above. Specific examples of nonmagnetic powder with a Mohs hardness of 6 or higher are α-iron oxide powder, chromium oxide powder, aluminum oxide powder, silicon oxide powder, silicon carbide powder and garnet powder.

The backcoating layer 5 preferably has a thickness of 0.01 to 0.8 μm, particularly 0.1 to 0.7 μm, in view of the thickness balance with the magnetic layer 4 and the intermediate layer 3. The binder and solvent for use in the backcoating composition include those enumerated with respect to the coating composition for the formation of the magnetic layer 4. The binder is preferably used in an amount of 50 to 200 parts by weight, particularly 70 to 150 parts by weight, per 100 parts by weight of the nonmagnetic powder. The solvent is preferably used in an amount of 80 to 500 parts by weight, particularly 100 to 350 parts by weight, per 100 parts by weight of the nonmagnetic powder.

The magnetic recording medium 1 shown in FIG. 1 preferably has a total thickness of 2 to 15 μm, particularly 2 to 12 μm, for securing suitability to high-density recording.

In the magnetic recording medium of the present invention, the skewness of the backcoating layer 5 (hereinafter referred to as Rsk (B)) is greater than the skewness of the magnetic layer 4 (hereinafter referred to as Rsk (M)) (condition (i)). It is preferable that Rsk (B) ranges from 0 to +2 and that Rsk (M) ranges from −2 to 0. It is still more preferable that Rsk (B) ranges from 0 to +1 and that Rsk (M) ranges from −0.1 to −1.2. The terminology "skewness (Rsk)" as used herein is an indication of the degree of the symmetry of the surface profile about the mean line of a roughness assessment obtained with a laser interference profilometer. Skewness is calculated from equation (1):

$$Rsk = \frac{1}{n(Rq)^3} \sum_{i=1}^{i=n} (y_i)^3 \quad (1)$$

wherein yi represents the distance from the mean line to the peak (positive value) or valley (negative value); Rq represents a root-mean-square (rms) roughness; and n represents the number of data points. To have a positive Rsk value means that the surface has relatively many sharp and high peaks. To have a negative Rsk value means that the surface has relatively many sharp and deep valleys, that is, the surface has relatively fewer sharp and high peaks. Accordingly, the surface of the magnetic layer 4 has fewer peaks than that of the backcoating layer 5. By designing the magnetic recording medium so as to have such surface profile characteristics, the contact between the magnetic layer and a magnetic head is stabilized and, where the backcoating layer and the magnetic layer are in contact, the friction between them can be lessened, and the friction between the recording medium and guide rolls can be reduced.

The surface profile of the magnetic layer and the backcoating layer of the magnetic recording medium of the present invention, for example, a magnetic tape, may be controlled so as to satisfy the above-mentioned relationship of Rsk (M) of the magnetic layer and Rsk (B) of the backcoating layer by (a) appropriately selecting the conditions of calendering (for example, the running speed of the tape is set at 10 m/min or more, or the linear pressure of the calender rolls is set between 250 to 500 kgf/cm) or (b) polishing the slit tape under specific conditions (for example, an abrasive having a Knoop hardness number of 2500 or more is used).

As described above, the nonmagnetic polymer substrate has a molecular orientation ratio of 1.11 or greater (condition (ii)). The "molecular orientation ratio" is a parameter indicative of orientation of polymer chains of the nonmagnetic polymer substrate (see, e.g., *Hyomen*, Vol. 32, No. 1, p. 28–37 (1994)). To have a molecular orientation ratio of 1.11 or greater means that the nonmagnetic polymer substrate has been stretched in one direction to a higher degree than in the direction perpendicular thereto and, as a result, the polymer chains are orientated in the direction of stretch more than in the direction perpendicular thereto. The above-specified molecular orientation ratio can be obtained by adjusting the stretch ratio in stretching a polymer film for the preparation of the nonmagnetic polymer substrate. The molecular orientation ratio of the nonmagnetic polymer substrate can be measured with a commercially available instrument for measuring molecular orientation, such as MOA-3020 manufactured by Oji Keisoku Kiki K.K.

As described above, the angle between the main axial direction of the polymer chains in the nonmagnetic polymer substrate and the longitudinal direction of the substrate is 7° or smaller (condition (iii)). The "main axial direction of the polymer chains" is the direction which gives the greatest intensity of transmitted microwaves when microwaves are applied to the substrate. Such a main axial direction can be determined by means of the above-mentioned instrument for measuring molecular orientation. The term "longitudinal direction" as used herein denotes the longitudinal direction of a magnetic tape as an embodiment of the magnetic recording medium according to the present invention, or the longitudinal direction of a stock web before punching into a substrate for a magnetic disk as another embodiment of the magnetic recording medium of the present invention. The angle between the longitudinal direction and the main axial direction may be adjusted within 7° by, for example, stretching a polymer film in the preparation of the nonmagnetic polymer substrate as uniformly as possible so as to minimize strain.

The nonmagnetic polymer substrate satisfying the conditions (ii) and (iii), the magnetic recording medium of the present invention, for example, a magnetic tape, has excellent running stability with little wobbling in the width direction during running. As a result, the magnetic tape recorded even at high density provides a stable high output reproduction. From the above standpoint, the molecular orientation ratio of the nonmagnetic polymer substrate (condition (ii)) is preferably 1.12 or greater, and the angle between the longitudinal direction of the substrate and the main axial direction of the polymer chains (condition (iii)) is preferably 5° or smaller. The molecular orientation ratio is preferably 10 at the most since it is difficult in practice to obtain a molecular orientation ratio exceeding 10.

An illustrative example of a process for producing the magnetic recording medium shown in FIG. 1 will be described in brief. A magnetic or nonmagnetic coating composition forming an intermediate layer 3 and a magnetic coating composition forming a magnetic layer 4 are applied to a substrate 2 by simultaneous coating in a wet-on-wet coating system to form an intermediate layer 3 and a magnetic layer 4 having the above-described respective dry thicknesses. The simultaneous coating may be carried out in accordance with the method described in Japanese Patent Laid-Open No. 5-73883, column 42, line 31 to column 43, line 31, incorporated herein by reference. The coated layers are then subjected to an orientation treatment in a magnetic field, dried, and calendered. A backcoating composition is applied to the back side of the substrate to provide a backcoating layer 5, followed by drying. After aging, the thus obtained stock web is slit to the desired width.

The orientation treatment in a magnetic field may be performed before the intermediate nonmagnetic or magnetic coating composition and the magnetic coating composition dry. In the production of a magnetic tape, for instance, the orientation treatment may be carried out by applying a magnetic field of about 500 Oe or higher, preferably 1,000 to 10,000 Oe, in parallel with the coated surface or passing the coated film through a solenoid type magnet of 1,000 to 10,000 Oe while the intermediate nonmagnetic or magnetic coating composition and the magnetic coating composition are wet.

The calendering of the coated layers is carried out by, for example, supercalendering comprising passing the coated film between two rolls, such as a combination of a metal roll and a cotton roll or a synthetic resin roll, or a combination of two metal rolls. The drying of the coated layer are conducted by, for example, supplying gas heated to 30 to 120° C. The degree of drying may be controlled by adjusting the temperature and the feed rate of the gas.

The above process is only an illustrative example as noted so that various modifications may be made therein. For example, the calendering may be done after the formation of the backcoating layer.

The magnetic recording medium may have additional layers. Specifically, an adhesive layer may be provided between the nonmagnetic polymer substrate 2 and the intermediate layer 3, or an additional magnetic or nonmagnetic layer for recording servo signals may be provided between the substrate 2 and the intermediate layer 3 or between the intermediate layer 3 and the magnetic layer 4 in order to cope with hardware systems using long wavelength signals.

Having generally described this invention, a further understanding can be obtained by reference to certain specific examples which are provided for purposes of illustration only and are not intended to be limiting unless otherwise specified. Unless otherwise noted, all the parts are given by weight.

EXAMPLE 1

The following components were mixed and dispersed thereby to prepare an intermediate layer coating composition, a magnetic coating composition and a backcoating composition, respectively.

| Formulation of Intermediate Coating Composition: | |
|---|---|
| Nonmagnetic powder (α-iron oxide; acicular; average major axis length: 0.18 μm) | 100 parts |
| Abrasive (alumina; average particle size: 0.30 μm) | 7 parts |
| Antistatic agent (carbon black; average primary particle size: 20 nm) | 2 parts |
| Binders: | |
| Sulfonate-containing vinyl chloride copolymer resin | 11 parts |
| Sulfonate-containing polyurethane resin | 4 parts |
| Lubricants: | |
| Stearic acid | 2 parts |
| Butyl oleate | 2 parts |
| Hardener: Isocyanate hardener | 4 parts |
| Solvent (mixture of methyl ethyl ketone/ toluene/cyclohexanone = 1/1/1 by weight) | 300 parts |
| Formulation Magnetic Coating Composition: | |
| Ferromagnetic powder predominantly comprising iron (coercive force: 1850 Oe; saturation magnetization: 130 emu/g; average major axis length: 0.10 μm) | 100 parts |
| Abrasive (alumina; average particle size: 0.30 μm) | 16 parts |
| Antistatic agent (carbon black; average primary particle size: 0.02 μm) | 1 part |
| Binders: | |
| Sulfonate-containing vinyl chloride copolymer resin | 11 parts |
| Sulfonate-containing polyurethane resin | 7 parts |
| Lubricants: | |
| Searic acid | 4 parts |
| Butyl oleate | 2 parts |
| Hardener: Isocyanate hardener | 4 parts |
| Solvent (mixture of methyl ethyl ketone/ toluene/cyclohexanone = 1:1:1 by weight) | 300 parts |
| Formulation of Backcoating Composition: | |
| Carbon black (average primary particle size: 17 nm) | 40 parts |
| Binders: | |
| Polyurethane resin | 20 parts |
| Nitrocellulose | 20 parts |
| Hardener: Polyisocyanate resin | 20 parts |
| Solvent (mixture of methyl ethyl ketone/ toluene/cyclohexanone 1/1/1 by weight) | 300 parts |

The magnetic coating composition and the intermediate layer coating composition were simultaneously applied to a 6 μm thick PET film at a line speed of 100 m/min, to form a surface layer composed of a magnetic layer and an intermediate layer with a dry thickness (after calendering) of 0.2 μm and 1.3 μm, respectively. While wet, the coated layers were subjected to magnetic field orientation by passing through a solenoid type magnet of 5000 Oe, and dried for 30 seconds in a drier where hot air of 90° C. was fed at a speed of 15 m/sec, and taken up. After conducting a dust removing treatment and an antistatic treatment, the coated film was subjected to calendering (mirror finish) so as to give a prescribed surface profile (preferably a center-line surface roughness Ra of 6 nm or smaller). Calendering was carried out with a supercalender at a line speed of 100 m/min, a roll linear pressure of 300 kgf/cm, and a roll surface temperature of 90° C. The opposite side of the PET film was then coated with the backcoating composition to a dry thickness of 0.5 μm, dried at 90° C. to form a backcoating layer as a back layer, and taken up. Immediately thereafter, the coated film was slit into a 8 mm wide strip which is called "Pancake", and the surface and back layers were cleaned with nonwoven cloth to obtain a magnetic recording tape. The surface of the tape was polished with a sapphire blade (Knoop hardness number: 2600). 120 meters of the resulting tape was put into a cassette case to prepare a 8mm-Tape cassette for evaluation. The above coating and calendering were carried out on the same line (in-line system).

The skewness, the characteristics of the substrate, the output, and running stability of the resulting magnetic tape were measured in accordance with the following methods. The results obtained are shown in Table 1 below.

Method of Measurement:

1) Skewness (Rsk)

Rsk (M) of the surface of the magnetic layer and Rsk (B) of the surface of the backcoating layer were measured with a laser interference type profilometer (Model Maxium 3D 5700, manufactured by ZYGO) under the following conditions.

Lens: Fizeau 40×
Remove: cylinder
Trim: 0
Filter: off

2) Characteristics of Substrate

The magnetic layer, the intermediate layer, and the backcoating layer were peeled off the tape with methyl ethyl ketone to prepare a sample of the substrate only. The sample was set on a molecular orientation analyzer MOA-3020 manufactured by Oji Keisoku Kiki K.K. to measure the orientation pattern, from which the molecular orientation ratio and the angle of the main axial direction of the polymer chains and the longitudinal direction of the substrate were obtained. The measuring frequency was about 4 GHz.

3) Output (recording frequency=1 MHz, 7 MHz)

The magnetic tape was put in a tape cassette for 8 mm tape to obtain a cassette tape for evaluation. Signals having a recording frequency of 1 MHz and 7 MHz were recorded respectively on the cassette tape at ambient temperature (23° C.) on a Hi-8 drive. The output on reproduction of the recorded signals (reproduction output) was measured. As a reference, the magnetic tape of Comparative Example 1 hereinafter described was recorded in the same manner. The results obtained above were expressed relatively taking the output of the reference tape of Hi-8 as a standard (100%).

4) Running Stability

The magnetic tape was run on Hi-8 drive, and wobbling in the width direction (variation: $\mu$m) was optically measured.

EXAMPLE 2

Example 1 was repeated, except that a polyethylene terephthalate film having the characteristics shown in Table 1 was used as a nonmagnetic polymer substrate and that the backcoating layer was formed before calendering.

COMPARATIVE EXAMPLE 1

Example 1 was repeated, except that a polyethylene terephthalate film having the characteristics shown in Table 1 was used as a nonmagnetic polymer substrate and that the calendering was conducted at line speed of 80 m/min and a roll surface temperature of 80° C.

COMPARATIVE EXAMPLE 2

Example 1 was repeated, except that a polyethylene terephthalate film having the characteristics shown in Table 1 was used as a nonmagnetic polymer substrate and that the pan cake was polished with an abrasive tape containing α-alumina which has Knoop hardness number of about 2000.

COMPARATIVE EXAMPLE 3

Example 1 was repeated, except that a polyethylene terephthalate film having the characteristics shown in Table 1 was used as a nonmagnetic polymer substrate and that the calendering was conducted at a linear pressure of 200 kgf/cm and a roll surface temperature of 102° C.

COMPARATIVE EXAMPLE 4

Example 1 was repeated, except that a polyethylene terephthalate film having the characteristics shown in Table 1 was used as a nonmagnetic polymer substrate, the calendering was conducted at a line speed of 95 m/min and a roll surface temperature of 85° C., and the pan cake was polished with an abrasive tape containing α-alumina.

The results of Example 2 and Comparative Examples 1 to 4 are shown in Table 1 together with the results of Example 1.

TABLE 1

| | Skewness | | Characteristics of Substrate | | Output (%) | | Running Stability (Variation in Width Direction) |
| --- | --- | --- | --- | --- | --- | --- | --- |
| | | | Molecular Orientation | Angle of Orientation* | | | |
| | Rsk (M) | Rsk (B) | Ratio | (degree) | 1 MHz | 7 MHz | ($\mu$m) |
| Example 1 | −0.81 | 1.05 | 1.145 | 0.00 | 108 | 132 | 0 |
| Example 2 | −0.02 | 0.16 | 1.115 | 5.00 | 100 | 102 | 8 |
| Comparative Example 1 | −0.06 | 0.75 | 1.060 | 6.00 | 100 | 100 | 45 |
| Comparative Example 2 | −0.17 | 0.86 | 1.112 | 9.00 | 90 | 80 | 30 |
| Comparative Example 3 | 0.02 | 0.14 | 1.115 | 23.00 | 90 | 97 | 86 |
| Comparative Example 4 | 1.23 | −0.23 | 1.028 | 25.00 | 86 | 60 | 123 |

Note:
*Angle of orientation: the angle between the longitudinal direction of the substrate and the main axial direction of the polymer chains.

As is apparent from the results in Table 1, the magnetic recording media of the present invention (Examples 1 and 2) exhibit excellent output characteristics and excellent running stability with little wobbling in the width direction.

Obviously, numerous modifications and variations of the present invention are possible in light of the above teachings. It is therefore to be understood that within the scope of the appended claims, the invention may be practiced otherwise than as specifically described herein.

What is claimed is:

1. A magnetic recording medium comprising:
   (I) a nonmagnetic polymer substrate,
   (II) a magnetic layer, on said nonmagnetic polymer substrate, and
   (III) a backcoating layer, on said nonmagnetic polymer substrate, opposite said magnetic layer,
   wherein the skewness of said backcoating layer is greater than the skewness of said magnetic layer,
   said nonmagnetic polymer substrate has a molecular orientation ratio of 1.11 or greater, and
   the angle between the main axial direction of the polymer chains in said nonmagnetic polymer substrate and the longitudinal direction of said nonmagnetic polymer substrate is 7° or smaller.

2. The magnetic recording medium of claim 1, wherein the skewness of said magnetic layer is −2 to 0, and
   the skewness of said backcoating layer is 0 to +2.

3. The magnetic recording medium of claim 1, further comprises an intermediate layer between said magnetic layer and said nonmagnetic polymer substrate,
   wherein said magnetic layer has a thickness of 0.01 to 0.5 μm,
   said intermediate layer has a thickness of 0.05 to 3.0 μm, and
   said backcoating layer has a thickness of 0.01 to 0.8 μm.

4. A method of making the magnetic recording medium of claim 3, comprising:
   coating said intermediate layer on said substrate;
   coating said magnetic layer on said intermediate layer; and
   coating said backcoating layer on said substrate.

5. The method of claim 4, wherein said coating of said intermediate layer and said coating of said magnetic layer are carried out simultaneously in a wet-on-wet manner.

6. The method of claim 4, further comprising:
   orienting treatment, drying and calendering.

7. The magnetic recording medium of claim 3, wherein said magnetic layer comprises:
   a ferromagnetic powder,
   a binder,
   an abrasive,
   carbon black, and
   a lubricant, and
   said intermediate layer comprises:
   a nonmagnetic powder,
   a binder,
   an abrasive,
   carbon black and
   a lubricant.

8. The magnetic recording medium of claim 7, wherein said ferromagnetic powder is selected from the group consisting of acicular or spindle-shaped ferromagnetic metal powder having a major axis length of 0.05 to 0.25 μm, and acicular or spindle-shaped iron oxide powder having a major axis length of 0.05 to 0.25 μm.

9. The magnetic recording medium of claim 7, wherein said nonmagnetic powder is acicular and has a major axis length of 20 to 300 nm.

10. The magnetic recording medium of claim 1, wherein said backcoating layer comprises:
    (a) carbon black particles having an average particle size of 0.01 to 0.03 μm, and
    (b) nonmagnetic particles having an average particle size of 0.1 to 0.3 μm and a Mohs hardness of 6 or higher,
    in a ratio of said fine carbon black particle: said nonmagnetic particles of 99:1 to 60:40 by weight.

11. The magnetic recording medium of claim 1, wherein said magnetic layer is prepared by a process comprising:
    calendering under a linear pressure of 250 to 500 kgf/cm.

12. The magnetic recording medium of claim 1, wherein said magnetic layer is prepared by a process comprising:
    calendering, followed by
    polishing with an abrasive having a Knoop hardness number of 2500 or greater.

13. The magnetic recording medium of claim 1, wherein the skewness of said magnetic layer is −0.1 to −1.2, and the skewness of said backcoating layer ranges is 0 to +1.

14. The magnetic recording medium of claim 1, wherein said nonmagnetic polymer substrate has a molecular orientation ratio of 1.12 or higher.

15. The magnetic recording medium of claim 1, wherein the angle between the main axial direction of the polymer chains in said nonmagnetic polymer substrate and the longitudinal direction of said nonmagnetic polymer substrate is 5° or smaller.

16. The magnetic recording medium of claim 1, wherein said magnetic recording medium has a total thickness of 2 to 15 μm.

17. A method of making the magnetic recording medium of claim 1, comprising:
    coating said magnetic layer on said substrate; and
    coating said backcoating layer on said substrate.

18. The method of claim 17, further comprising:
    orienting treatment, drying and calendering.

19. A magnetic recording medium, comprising:
    (I) a nonmagnetic polymer substrate,
    (II) a magnetic layer, on said nonmagnetic polymer substrate, as a top layer of said magnetic recording medium,
    (III) an intermediate layer between said magnetic layer and said nonmagnetic polymer substrate, and
    (IV) a backcoating layer on said nonmagnetic polymer substrate, opposite said magnetic layer,
    wherein the skewness of said backcoating layer is greater than the skewness of said magnetic layer,
    said nonmagnetic polymer substrate has a molecular orientation ratio of 1.11 or greater, and the angle between the main axial direction of the polymer chains in said nonmagnetic polymer substrate and the longitudinal direction of said nonmagnetic polymer substrate is 7° or smaller.

20. A method of making the magnetic recording medium of claim 19, comprising:
    coating said intermediate layer on said substrate;
    coating said magnetic layer on said intermediate layer, and
    coating and backcoating layer on said substrate.

* * * * *